United States Patent
Jung et al.

(10) Patent No.: US 9,896,596 B2
(45) Date of Patent: *Feb. 20, 2018

(54) PLASTIC FILM

(71) Applicant: LG CHEM, LTD., Seoul (KR)

(72) Inventors: Soon Hwa Jung, Daejeon (KR); Boo Kyung Kim, Daejeon (KR); Seok Hoon Jang, Daejeon (KR); Joon Koo Kang, Daejeon (KR); Jae Hoon Shim, Daejeon (KR); Seung Jung Lee, Daejeon (KR); Yeong Rae Chang, Daejeon (KR); Sung Don Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 119 days.

This patent is subject to a terminal disclaimer.

(21) Appl. No.: 14/777,445

(22) PCT Filed: Mar. 13, 2014

(86) PCT No.: PCT/KR2014/002127
§ 371 (c)(1),
(2) Date: Sep. 15, 2015

(87) PCT Pub. No.: WO2014/142583
PCT Pub. Date: Sep. 18, 2014

(65) Prior Publication Data
US 2016/0024330 A1 Jan. 28, 2016

(30) Foreign Application Priority Data

Mar. 15, 2013 (KR) .......... 10-2013-0028137
Mar. 15, 2013 (KR) .......... 10-2013-0028142
Mar. 12, 2014 (KR) .......... 10-2014-0029031

(51) Int. Cl.
| | |
|---|---|
| C09D 133/14 | (2006.01) |
| C08K 7/26 | (2006.01) |
| G02B 1/11 | (2015.01) |
| C09D 183/06 | (2006.01) |
| G02B 1/111 | (2015.01) |
| G02B 1/14 | (2015.01) |
| G02B 1/18 | (2015.01) |
| B32B 27/30 | (2006.01) |
| B32B 27/20 | (2006.01) |
| B32B 27/08 | (2006.01) |
| C08J 5/18 | (2006.01) |
| C09D 133/04 | (2006.01) |
| G02B 1/10 | (2015.01) |
| C09D 4/00 | (2006.01) |
| C08J 7/04 | (2006.01) |
| C08F 222/10 | (2006.01) |

(52) U.S. Cl.
CPC ............ *C09D 133/14* (2013.01); *B32B 27/08* (2013.01); *B32B 27/20* (2013.01); *B32B 27/30* (2013.01); *C08J 5/18* (2013.01); *C08J 7/047* (2013.01); *C08K 7/26* (2013.01); *C09D 4/00* (2013.01); *C09D 133/04* (2013.01); *C09D 183/06* (2013.01); *G02B 1/10* (2013.01); *G02B 1/11* (2013.01); *G02B 1/111* (2013.01); *G02B 1/14* (2015.01); *G02B 1/18* (2015.01); *B32B 2250/24* (2013.01); *B32B 2264/102* (2013.01); *B32B 2307/412* (2013.01); *C08F 222/10* (2013.01); *C08J 2333/08* (2013.01); *C08J 2367/02* (2013.01); *C08J 2433/00* (2013.01); *C08J 2433/08* (2013.01); *G02B 1/105* (2013.01)

(58) Field of Classification Search
CPC .......... G02B 1/11; G02B 1/10; C09D 133/14; C09D 183/06; C09D 4/00; C08J 5/18
See application file for complete search history.

(56) References Cited

U.S. PATENT DOCUMENTS

| | | |
|---|---|---|
| 7,781,070 B2 | 8/2010 | Okano et al. |
| 2005/0109238 A1 | 5/2005 | Yamaki et al. |
| 2006/0182945 A1* | 8/2006 | Yoneyama ........ B32B 17/10018 428/304.4 |
| 2006/0269733 A1 | 11/2006 | Mizuno et al. |
| 2009/0214871 A1* | 8/2009 | Fukuda ............... C09D 4/00 428/413 |

FOREIGN PATENT DOCUMENTS

| | | |
|---|---|---|
| EP | 2219051 A1 | 8/2010 |
| JP | 11-43646 A | 2/1999 |
| JP | 2000-112379 A | 4/2000 |
| JP | 3676260 B2 | 7/2005 |
| JP | 2007-084655 A | 4/2007 |
| JP | 2008-122603 A | 5/2008 |

(Continued)

OTHER PUBLICATIONS

Translation of JP 2011046917, Ruslim et al., Mar. 10 2011, p. 1-34.*
Translation of JP 2009204727, Fukuda et al., Sep. 10 2009, p. 1-54.*
XP002760714, Database WPI Week 201014 Thomson Scientific, London, GB (2 pages).
Extended Search Report issued for European Patent Application No. 14765283.8 dated Aug. 22, 2016, 7 pages.
International Search Report issued in International Application No. PCT/KR2014/002127 dated Jun. 24, 2014, 3 pages.

*Primary Examiner* — Hai Vo
(74) *Attorney, Agent, or Firm* — Rothwell, Figg, Ernst & Manbeck, P.C.

(57) ABSTRACT

Disclosed is a plastic film exhibiting excellent physical properties including a high level of hardness, high scratch resistance, and low reflection. Exhibiting a high level of hardness, scratch resistance, impact resistance, low reflectivity, and high transparency, the plastic film can be used as a substitute for a cover plate made of glass or reinforced glass.

16 Claims, No Drawings

(56) References Cited

FOREIGN PATENT DOCUMENTS

| | | | |
|---|---|---|---|
| JP | 2008-150484 A | 7/2008 | |
| JP | 2008-310286 A | 12/2008 | |
| JP | 2009-204725 A | 9/2009 | |
| JP | 2009-204727 A | 9/2009 | |
| JP | 2009204727 A * | 9/2009 | |
| JP | 2010-001431 A | 1/2010 | |
| JP | 2010-078642 A | 4/2010 | |
| JP | 2010-121013 A | 6/2010 | |
| JP | 2010-191023 A | 9/2010 | |
| JP | 2011-031527 A | 2/2011 | |
| JP | 2011046917 A * | 3/2011 | ............ C08F 299/00 |
| JP | 2011-255663 A | 12/2011 | |
| JP | 2012-128064 A | 7/2012 | |
| JP | 5046482 B2 | 10/2012 | |
| KR | 10-2005-0117241 A | 12/2005 | |
| KR | 10-2006-0111622 A | 10/2006 | |
| KR | 10-2007-0096329 A | 10/2007 | |
| KR | 10-2009-0118724 A | 11/2009 | |
| KR | 10-2010-0041992 A | 4/2010 | |
| KR | 10-2011-0014517 A | 2/2011 | |
| KR | 10-2011-0037622 A | 4/2011 | |
| KR | 10-1074948 B1 | 10/2011 | |
| KR | 10-2013-0132094 A | 12/2013 | |
| KR | 10-2014-0027025 A | 3/2014 | |
| WO | 2007-097258 A1 | 8/2007 | |

\* cited by examiner

PLASTIC FILM

CROSS REFERENCE TO RELATED APPLICATIONS

This application is a 35 U.S.C. §371 National Phase Entry Application from PCT/KR2014/002127, filed Mar. 13, 2014, and designating the United States, which claims priority under 35 U.S.C. § 119 to Korean Patent Application No. 10-2013-0028137 filed on Mar. 15, 2013, to Korean Patent Application No. 10-2013-0028142 filed on Mar. 15, 2013, and to Korean Patent Application No. 10-2014-0029031 filed on Mar. 12, 2014, which are incorporated herein by reference in their entireties.

BACKGROUND OF THE INVENTION (a) Field of the Invention

The present invention relates to a plastic film. More particularly, the present invention relates to a plastic film exhibiting excellent physical properties including a high level of hardness, high scratch resistance, and low reflection.

This application claims the benefit of Korean Patent Application No. 10-2013-0028137, filed on Mar. 15, 2013, Korean Patent Application No. 10-2013-0028142, filed on Mar. 15, 2013, and Korean Patent Application No. 10-2014-0029031, filed on Mar. 12, 2014, which are all hereby incorporated by reference in their entireties into this application.

(b) Description of the Related Art

With the advance of mobile devices such as smart phones, tablet PCs and the like, further lightness and thinness have recently been required of substrates for displays. Display windows or front panels of such mobile devices are generally made of glass or reinforced glass both of which have excellent mechanical properties. However, glass suffers from the disadvantage of increasing the weight of mobile devices and is easily broken by external impact.

As an alternative to glass, plastic resins have been studied. Their light weight and resistance to impact are consistent with the trend of pursuing lighter and thinner mobile devices. Particularly, a film with a high level of hardness and wear resistance is required. In this regard, the utilization of a structure in which the substrate is coated with a coating layer has been proposed.

First of all, increasing the thickness of the coating layer is considered a possible approach to improving the surface hardness thereof. In fact, the coating layer should be of a minimal thickness to ensure the surface hardness of the coating layer. As the coating layer increases in thickness, the degree of surface hardness thereof may become higher. However a thicker coating layer, although increasing the surface hardness, is more prone to setting shrinkage, which leads to wrinkling or curling with the concomitant production of cracks or exfoliations; and thus thick coating layers are difficult to employ in practice.

Recently, several methods have been proposed for conferring a high level of hardness to plastic films, without the problems of cracking and setting shrinkage-induced curling. Korean Patent Application Publication No. 2010-0041992 discloses a plastic film composition, free of monomers, comprising a binder resin based on ultraviolet-curable polyurethane acrylate oligomers. However, this plastic film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and is intended to provide a plastic film which exhibits a high level of hardness and impact resistance without the problems of curling, warping and cracking.

In accordance with an aspect thereof, the present invention provides a plastic film, comprising:

a support substrate;

a first coating layer, formed on one side of the support substrate;

a low-reflection coating layer, formed on the first coating layer; and a second coating layer, formed on the other side of the support substrate, wherein each of the first and the second coating layers comprise a first photocrosslinked copolymer, and first inorganic fine particles dispersed in the photocrosslinked copolymer, and the low-reflection coating layer comprises a second photocrosslinked copolymer, and a hollow silica particle dispersed in the second photocrosslinked copolymer.

Exhibiting a high level of hardness, low reflectivity, scratch resistance, and high transparency, in addition to being highly unlikely to curl and crack thanks to excellent processability, the plastic film of the present invention can be used as a substitute for a cover plate made of glass or reinforced glass, and thus can be usefully applied to mobile devices, display instruments, and front panels and display windows of various instruments.

DETAILED DESCRIPTION OF THE EMBODIMENTS

The plastic film of the present invention comprises:

a support substrate;

a first coating layer, formed on one side of the support substrate;

a low-reflection coating layer, formed on the first coating layer; and a second coating layer, formed on the other side of the support substrate, wherein each of the first and the second coating layer comprise a first photocrosslinked copolymer, and first inorganic fine particles dispersed in the photocrosslinked copolymer, and the low-reflection coating layer comprises a second photocrosslinked copolymer, and a hollow silica particle dispersed in the second photocrosslinked copolymer.

As used herein, the words "first" and "second" are employed only to describe various elements, and are intended to discriminate one element from another.

All of the terms used in the specification are taken only to illustrate embodiments, and are not intended to limit the present invention. As used herein and in the appended claims, the singular forms "a", "an", and "the" include plural references unless the context clearly dictates otherwise. Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to."

Additionally, the word "on" or "above," as used in the context of formation or construction of one element, means pertaining to the direct formation or construction of one element on another element directly or the additional formation or construction of one element between layers or on a subject or substrate.

The following detailed descriptions of embodiments of the invention are not intended to be exhaustive or to limit the invention to the precise form disclosed below. While examples for the invention are described below for illustrative purposes, specific embodiments of various equivalent modifications are possible within the scope of the invention, as those skilled in the relevant art will recognize.

Below, a detailed description will be given of the coating composition and the plastic film according to the present invention.

In accordance with an aspect of the present invention, the plastic film comprises a support substrate; a first coating layer, formed on one side of the support substrate; a low-reflection coating layer, formed on the first coating layer; and a second coating layer, formed on the other side of the support substrate, wherein each of the first and the second coating layer comprise a first photocrosslinked copolymer, and first inorganic fine particles dispersed in the photocrosslinked copolymer, and the low-reflection coating layer comprises a second photocrosslinked copolymer, and a hollow silica particle dispersed in the second photocrosslinked copolymer.

In the plastic film of the present invention, any typical plastic resin, whether capable of being stretched or not, may be used for the support substrate on opposite sides of which the first and the second coating layer are respectively formed, without limitations imposed thereon, so long as it is transparent.

According to an embodiment of the present invention, the support substrate may be a film made of, for example, a polyester such as polyethyleneterephtalate (PET); a polyethylene such as ethylene vinyl acetate (EVA); a cyclic olefin polymer (COP); a cyclic olefin copolymer (COC); polyacrylate (PAC); polycarbonate (PC); polyethylene (PE); polymethylmethacrylate (PMMA); polyetheretherketon (PEEK); polyethylenenaphthalate (PEN); polyetherimide (PEI); polyimide (PI); triacetylcellulose (TAC); MMA (methyl methacrylate); or a fluoro-polymer. The support substrate may be a single layer structure, and, if necessary, may be a multilayer structure including two or more layers composed of the same or different materials, but is not particularly limited.

According to an embodiment of the present invention, the substrate may be a multilayered substrate made of polyethyleneterephtalate (PET) or co-extruded polymethylmethacrylate (PMMA)/polycarbonate (PC).

Further, according to an embodiment of the present invention, the support substrate may include a copolymer of polymethylmethacrylate (PMMA) and polycarbonate (PC).

The support substrate may range in thickness from about 30 to about 1,200 μm, or from about 50 to about 800 μm, but is not limited thereto.

The plastic film of the present invention includes a first coating layer formed on one side of the support substrate, a low-reflection coating layer formed on the first coating layer, and a second coating layer formed on the other side of the support substrate, According to an embodiment of the present invention, the thickness ratio between the support substrate and the first coating layer or between the support substrate and the second coating may independently be about 1:0.5 to about 1:2, or about 1:0.5 to about 1:1.5. When the thickness ratio thereof is within the above range, a plastic film can be formed which exhibits a high level of hardness without being prone to curling or cracking.

In the plastic film of the present invention, each of the first and the second coating layer comprises a first photocrosslinked copolymer, and first inorganic fine particles dispersed in the first photocrosslinked copolymer.

According to one embodiment of the present invention, the first photocrosslinked copolymer may be a crosslinked (co)polymer of tri- to hexafunctional acrylate-based monomers.

As used herein, the term "acrylate-based" is intended to encompass acrylates, methacrylates, and substituted acrylates or methacrylates.

Examples of the tri- to hexafunctional acrylate-based monomers may include, but are not limited to, trimethylolpropane triacrylate (TMPTA), trimethylolpropane ethoxy triacrylate (TMPEOTA), glycerin-propoxylated triacrylate (GPTA), pentaerythritol tetraacrylate (PETA), and dipentaerythritol hexaacrylate (DPHA). These tri- to hexafunctional acrylate-based monomers may be used alone or in combination.

In one embodiment of the present invention, the first photocrosslinked copolymer may comprise a crosslinked copolymer of mono- to bifunctional acrylate-based monomers in addition to tri- to hexafunctional acrylated monomers.

Examples of the mono- to bifunctional acrylate-based monomers include hydroxyethylacrylate (HEA), hydroxyethylmethacrylate (HEMA), hexanedioldiacrylate (HDDA), tripropyleneglycol diacrylate (TPGDA), and ethyleneglycol diacrylate (EGDA). These mono- to bifunctional acrylate-based monomers may be used alone or in combination.

When the first photocrosslinked copolymer is a mixture of a photocrosslinked copolymer of mono- to bifunctional acrylate-based monomers and tri- to hexafunctional acrylate-based monomers, the content ratio between the mono- to bifunctional acrylate-based monomers and the tri- to hexafunctional acrylate-based monomer may be about 0.1:9 to about 5:5, or about 1:9 to about 5:5, or about 2:8 to about 4:6, but is not limited thereto.

According to an embodiment of the present invention, the first photocrosslinked copolymer may be a crosslinked copolymer of photocurable elastomers in addition to tri- to hexafunctional acrylate-based monomers.

As used herein, the term "photocurable elastomer" refers to a polymer which is elastic and contains a functional group that undergoes UV light-triggered crosslink polymerization. The first photocurable elastomer is crosslink-polymerized with the tri- to hexa-functional acrylate-based monomer and then cured to form a first and a second coating layer, conferring flexibility and impact resistance to the plastic film.

According to an embodiment of the present invention, the photocurable elastic polymer may have an elongation of approximately 15% or more, for example, approximately 15 to approximately 200%, approximately 20 to approximately 200%, or approximately 20 to approximately 150%, as measured according to ASTM D638. Given the elongation in the above-mentioned range, the photocurable elastomer forms a photocrosslinked copolymer with the tri- to hexafunctional acrylate-based monomer, conferring a high level of hardness and flexibility to the coating layer without deteriorating other properties, guaranteeing impact resistance to prevent the plastic film from being damaged by external impact.

Based on 100 parts by weight thereof, the first photocrosslinked copolymer may contain the photocurable elastomer in an amount of 5 to 20 parts by weight, and the tri- to hexafunctional acrylate-based monomer in an amount of 80 to 95 parts by weight in accordance with one embodiment of the present invention. When the first photocrosslinked copolymer in which the tri- to hexafunctional acrylate-based monomer and the photocurable elastomer are crosslink polymerized with each other at the above weight ratio is used, the plastic film of the present invention can exhibit a high level of hardness and high impact resistance without a decrease in other properties including curling and light resistance.

According to another embodiment of the present invention, the photocurable elastomer may be a polymer or oligomer having a weight average molecular weight of approximately 1,000 to approximately 600,000 g/mol or approximately 10,000 to approximately 600,000 g/mol.

The photocurable elastomer may be at least one selected from the group consisting of polycaprolactone, a urethane acrylate polymer, and polyrotaxane.

Among the polymers used as the photocurable elastomer, polycaprolactone is formed by the ring-opening polymerization of caprolactone, and has excellent physical properties such as flexibility, impact resistance, durability and the like.

Retaining a urethane bond therein, a urethane acrylate polymer has excellent elasticity and durability.

A polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

In one embodiment, the photocurable elastomer may include a rotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

No particular limitations are imposed on the macrocycle if it is large enough to surround the linear moiety. The macrocycle may include a functional group such as a hydroxide group, an amino group, a carboxyl group, a thiol group, an aldehyde group or the like, which can react with other polymers or compounds. Specific examples of the macrocycle may include α-cyclodextrin, β-cyclodextrin, γ-cyclodextrin and mixtures thereof.

Further, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repeating unit of 1 to 8 carbon atoms or a polylactone compound including a lactone repeating unit of 3 to 10 carbon atoms may be used in the thread.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

Exhibiting excellent scratch resistance, polyrotaxane can recover itself when it is damaged or scratched.

In one embodiment of the present invention, as the hard coating layer containing the photocurable elastomer is formed by photocuring, it allows the plastic film to have a high level of hardness and flexibility, ensuring excellent resistance to external impact.

In the plastic film of the present invention, each of the first and the second coating layer may comprise a first fine particle dispersed in the first photocrosslinked copolymer. Substantially free of voids, the first fine particle is different from a hollow silica particle which will be described later.

According to one embodiment of the present invention, the first inorganic fine particles may be nano-sized. For example, they may have a diameter of approximately 100 nm or less, or approximately 10 to approximately 100 nm, or approximately 10 to approximately 50 nm. As the first inorganic fine particles, for example, silica particles, aluminum oxide particles, titanium oxide particles, or zinc oxide particles may be employed.

The first inorganic fine particles can further reinforce the hardness of the plastic film.

Based on 100 parts by weight thereof, the first coating layer may contain the first photocrosslinked copolymer in an amount of approximately 50 to approximately 90 parts by weight and the first inorganic fine particles in an amount of approximately 10 to approximately 50 parts by weight, or the photocrosslinked copolymer in an amount of approximately 60 to approximately 80 parts by weight and the first inorganic fine particles in an amount of approximately 20 to approximately 40 parts by weight in accordance with one embodiment of the present invention.

Also, the second coating layer may contain the first photocrosslinked copolymer in an amount of approximately 50 to approximately 90 parts by weight and the first inorganic fine particles in an amount of approximately 10 to approximately 50 parts by weight, or the photocrosslinked copolymer in an amount of approximately 60 to approximately 80 parts by weight and the first inorganic fine particles in an amount of approximately 20 to approximately 40 parts by weight, based on the 100 parts by weight of the second coating layer, in accordance with one embodiment of the present invention. Given the amounts of the first photocrosslinked copolymer and the first inorganic fine particles within the ranges set forth above, the plastic film can be formed with excellent hardness and physical properties.

Meanwhile, the first and the second hard coating layers may further include additives typically used in the art, such as a surfactant, a yellowing inhibitor, a leveling agent, an antifouling agent and the like, in addition to the first photocrosslinked copolymer and the first inorganic fine particles. Here, the content of the additive may be variously adjusted to the degree that the desirable physical properties of the hard coating film are not degraded. Its content is not particularly limited, but preferably ranges from approximately 0.1 to approximately 10 parts by weight, based on 100 parts by weight of each of the first and the second coating layers.

According to an embodiment of the present invention, for example, the first and the second coating layers may include a surfactant as an additive. The surfactant may be a mono- or bi-functional fluorine acrylate, a fluorine-based surfactant, or a silicon surfactant. In this context, the surfactant may be contained in a dispersed or crosslinked form in the first photocrosslinked copolymer.

Further, the first and the second hard coating layers may include a yellowing inhibitor in a dispersed or crosslinked form as the additive. The yellowing inhibitor may be a benzophenone compound or a benzotriazole compound.

The first and the second coating layers may be independently formed by photocuring a coating composition comprising a binder containing a tri- to hexafunctional acrylate-based monomer, a photocurable elastomer, first inorganic fine particles, a photoinitiator, and optionally an additive.

Examples of the photoinitiator may include, but are not limited to: 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Further, the first and the second coating layers of the present invention may be formed by applying the coating composition optionally in an organic solvent to the support substrate, so as to adjust the viscosity and fluidity of the coating composition and to increase the coatability of the composition to the support substrate. Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

When the coating composition is applied with an organic solvent, the solid fraction including the photocrosslinked elastomer, the binder, the fine particles, the photoinitiator and other additives in the coating composition may be used at a weight ratio of about 70:30 to about 99:1 with regard to the organic solvent.

After being completely cured, the first and the second coating layers have a thickness of approximately 50 μm or higher, for example, approximately 50 to approximately 300 μm, approximately 50 to approximately 200 μm, approximately 50 to approximately 150 μm, or approximately 70 to approximately 150 μm. According to the present invention, a plastic film with a high level of hardness and impact resistance can be prepared without the formation of curls or cracks even when the first and the second coating layers are formed to the above thickness.

The plastic film of the present invention comprises a low-reflection coating layer formed on the first coating layer.

The low-reflection coating layer comprises a second photocrosslinked copolymer, and hollow silica particles dispersed in the second photocrosslinked copolymer.

For use in providing the low-reflection coating layer with necessary scratch resistance and wear resistance, the second photocrosslinked copolymer is imparted with no particular limitations if it is a polymer or a copolymer in which photocurable compounds are polymerized by light irradiation.

So long as it contains a functional group which can incur a polymerization reaction upon irradiation, any photocurable compound may be used to prepare the second photocrosslinked copolymer. In one embodiment of the present invention, the photocurable compound may be a monomer or oligomer containing a (meth)acrylate functional group, an acryloyl functional group or a vinyl functional group.

Examples of the photocurable compound containing an acrylate functional group include pentaerythritol triacrylate, pentaerythritol tetraacrylate, di pentaerythritol pentaacrylate, di pentaerythritol hexaacrylate, tripentaerythritol heptaacrylate, trilene diisocyanate, xylene diisocyanate, hexamethylene diisocyanate, trimethylolpropane tri(meth)acrylate, and trimethylolpropane polyethoxy triacrylate.

In addition, the oligomer containing an acrylate functional group may be exemplified by urethane-modified acrylate oligomers, epoxy acrylate oligomers, etheracrylate oligomers, and dendritic acrylate oligomers, and may have a molecular weight of approximately 1,000 to 10,000 g/mol.

Representative among the photocurable compound containing a methacrylate functional group are trimethylolpropanetrimethacrylate, ethyleneglycol dimethacrylate, butanediol dimethacrylate, hexaethyl methacrylate, and butyl methacrylate.

As for the photocurable compound containing a vinyl functional group, its examples include divinylbenzene, styrene, and paramethylstyrene.

Together with the multi-functional acrylate compound, a fluorine acrylate compound may be used as the photocurable compound. In this regard, it may be advantageous in terms of scratch resistance to adjust the weight ratio of the fluorine acrylate compound to the multi-functional acrylate compound within a range of 100:0.1 to 10.

The low-reflection coating layer comprises the second photocrosslinked copolymer in which the photocurable compounds are crosslink polymerized with each other.

Further, the low-reflection coating layer of the present invention comprises hollow silica particles dispersed in the second photocrosslinked copolymer.

The hollow silica particles have an advantage over stuffed silica particles in terms of anti-reflection properties.

For this, the hollow silica particles may have a number average diameter of approximately 20 to approximately 80 nm, or approximately 20 to approximately 70 nm, or approximately 30 to approximately 70 nm, and their morphology is not particularly limited, but is preferably spherical.

In addition, some of the hollow silica particles may be surface treated with a fluorine-based compound. Surface treatment with a fluorine-based compound may lower a surface energy of the particles, which allows the particles to be dispersed more evenly within the composition, giving rise to an improvement in scratch resistance. The introduction of a fluorine-based compound to the surface of the hollow silica particles may be achieved by, but not limited to, hydrolyzing and condensing the hollow silica particles and the fluorine-based compound through a sol-gel reaction in the presence of water and a catalyst.

For use in guaranteeing scratch resistance and an anti-reflection effect to the low-reflection coating layer, the hollow silica particles may be employed in an amount of approximately 50 to approximately 250 parts by weight (however, based on a solid content in the case of a hollow silica particle dispersion), or approximately 50 to approximately 200 parts by weight, or approximately 50 to approximately 160 parts by weight, based on 100 parts by weight of the second crosslinked copolymer of the photocurable compound.

In this regard, the hollow silica particles may exist in a dispersed form in an organic solvent, and the solid content (hollow silica particle content) of the dispersion may be determined in full consideration of the above-mentioned amount of hollow silica particles, and the viscosity suitable for applying the composition.

According to one embodiment of the present invention, the low-reflection coating layer may further a polyethersiloxane-based polymer represented by the following Chemical Formula 1:

[Chemical Formula 1]

wherein, $R^1$ and $R^2$ each are independently an alkyl group of 1 to 10 carbon atoms, an aryl group of 6 to 10 carbon atoms, an aralkyl group of 6 to 15 carbon atoms, a fluorinated aryl group of 6 to 10 carbon atoms, or a fluorinated aralkyl group of 6 to 15 carbon atoms; and n is an integer of 100 to 600.

Given the polyethersiloxane-based polymer, the low-reflection coating layer can more evenly disperse the hollow silica particles and thus improve in scratch resistance.

As shown in Chemical Formula 1, the polyethersiloxane-based polymer does not contain an acryl group nor a methacryl group. When used, a polyethersiloxane-based polymer containing an acryl group or a methacryl group can bring about a little improvement in scratch resistance, compared to the absence of the polyethersiloxane-based polymer, but incurs haze and deteriorates the coatability of the composition. That is, clearness and smoothness, which are fundamental requirements for the appearance of a film, are not observed in the coating. In detail, because the coating is non-uniformly or wholly hazed, the film becomes poor in light transmittance and image clarity. Hence, it is advantageous to employ the polyethersiloxane-based polymer of Chemical Formula 1.

The polyethersiloxane-based polymer may be employed in an amount of approximately 1 to approximately 50 parts by weight, approximately 5 to 40 parts by weight, or approximately 5 to approximately 30 parts by weight, based on 100 parts by weight of the second photocrosslinked copolymer of the photocurable compound.

To secure at least the effect of addition, the polyethersiloxane-based polymer may be preferably contained in an amount of 1 weight part or more, based on 100 parts by weight of the second photocrosslinked copolymer of the photucurable compound. When too excess an amount of the polyethersiloxane-based polymer is added, the plastic film shows high reflectance and poor appearance. Accordingly, the content of the polyethersiloxane-based polymer is preferably less than 50 parts by weight based on 100 parts by weight of the second photocrosslinked copolymer of the photocuarble compound.

When the polyethersiloxane-based polymer, together with the hollow silica particles, the low-reflection coating layer, a constituent of the plastic film of the present invention, can poorly reflect and highly transmit light, ensuring excellent scratch resistance in the plastic film, without a decrease in image clarity.

In addition to the above-mentioned components, the low-reflection coating may also contain second inorganic fine particles.

Herein, the second inorganic fine particles are of a nanoscale size. For example, they may have a diameter of approximately 100 nm or less, or approximately 10 to approximately 100 nm, or approximately 10 to approximately 50 nm. Compared to the aforementioned hollow silica particles, the second inorganic fine particles are substantially free of voids elsewhere. After the composition is applied, the second inorganic fine particles are distributed across the low-reflection coating layer during a drying process, and particularly contribute to film strength, conferring improved scratch resistance to the plastic film.

The second inorganic fine particles may be identical to or different from the first inorganic fine particles contained in the first and the second coating layers. As the second inorganic fine particles, for example, selection may be made from any of: silica fine particles, aluminum oxide particles, titanium oxide particles, or zinc oxide particles.

In addition, the content of the second inorganic fine particles may be determined within the range intended not only to guarantee at least the effect of addition, but also not to degrade the desired physical properties of the composition. In one embodiment of the present invention, the second inorganic fine particles may be used in an amount of: approximately 1 to approximately 120 parts by weight, approximately 10 to approximately 80 parts by weight, or approximately 10 to approximately 50 parts by weight, based on 100 parts by weight of the second photocrosslinked copolymer of the photocurable compound.

Moreover, the low-reflection coating layer of the present invention may further comprise a fluorine-based surfactant in addition to the aforementioned components. When distributed on the surface of the coating layer, the fluorine surfactant can confer a surface slip property to the film, thereby improving the anti-fouling property and scratch resistance of the film.

If it is typically used in the art, any fluorine-based surfactant may be used without particular limitations imparted to its composition. In one embodiment of the present invention, the fluorine-based surfactant may be commercially available, such as that sold from DIC, under the brand name of magaface F-444, magaface F-445, magaface F-470, magaface F-477, or magaface MCF-350SF.

Based on 100 parts by weight of the second photocrosslinked copolymer, the fluorine-based surfactant may be contained in an amount of: approximately 1 to approximately 50 parts by weight, approximately 1 to approximately 30 parts by weight, or approximately 2 to approximately 20 parts by weight. That is, the content of the fluorine-based surfactant is set forth within the range in order not only to guarantee at least the effect of addition, but also to prevent the degradation of wear resistance, which may occur with excessive quantities.

The low-reflection coating layer may be formed by photocuring a low-reflection coating composition comprising the photocurable compound, the hollow silica particles, and the photoinitiator, optionally together with the polyethersiloxane-based polymer of Chemical Formula 1, the second inorganic fine particles, the surfactant, and the solvent.

In addition, the low-reflection coating composition may further include typical additives such as a leveling agent, an antifouling agent, and the like in addition to the above-mentioned components. Here, the content of the additive is may be variously adjusted to the degree that the desirable physical properties of the plastic film are not degraded. Its content is not particularly limited.

Any photoinitiator that is typically used in the art may be employed without limitations. The photoinitiator used in the low-reflection coating composition may be the same as or different from that contained in the first and the second coating compositions.

So long as it has a negative effect on the physical properties of the composition, any typical solvent may be used in the low-reflection coating composition. The solvent may be selected from the group consisting of ketones, alcohols, acetates and ethers. More preferably, the solvent may be selected from among ketones, such as methylethylketone, methylisobutyl ketone, acetylacetone, and isobutylketone; alcohols, such as methanol, ethanol, n-propanol, i-propanol, n-butanol, i-butanol, and t-butanol; acetates, such as ethylacetate, i-propylacetate, and polyethylene glycol monomethylether acetate; ethers, such as tetrahydrofuran, and propylene glycol monomethylether; and a combination thereof.

The solvent may be added as a dispersion in which the hollow silica particles are dispersed. In this context, the content of the solvent may be determined within a range suitable for applying the low-reflection coating composition, and is not particularly limited. However, when the fluidity of the composition is poor, the film may be striated. On the other hand, when an excess of the solvent is added, the solid content is too low, causing problems upon drying and curing. Hence, in full consideration of these conditions, the content of the solvent may be determined. Preferably, the solvent may be used such that the solid content of the low-reflection coating composition may range from approximately 1 to approximately 20 weight %, and more preferably from approximately 1 to approximately 15 weight %.

As for the thickness of the low-reflection coating layer, its range may be determined in order to guarantee at least the effect of low-reflection coating, as well as not to degrade the transmittance. The thickness may range from approximately 50 to approximately 200 nm, or from approximately 80 to approximately 150 nm.

The plastic film of the present invention may be prepared by applying the coating composition and the low-reflection coating composition to the substrate and photocuring the compositions with UV, using a coating device and method typical to the art.

For example, the coating composition and the low-reflection coating composition may be applied to the support substrate by bar coating, knife coating, roll coating, blade coating, die coating, micro-gravure coating, comma coating, slot die coating, lip coating, solution casting or the like.

UV radiation may be emitted at a dose of approximately 20 to approximately 600 mJ/cm$^2$, or approximately 50 to approximately 500 mJ/cm$^2$. Any light source that is used in the art can be applied to the present invention without particular limitation. For example, a high-pressure mercury lamp, a metal halide lamp, a black light fluorescent lamp or the like may be used. The photocuring may be carried out by irradiating UV light at the dose for approximately 30 sec to approximately 15 min, or for approximately 1 to approximately 10 min.

According to one embodiment of the present invention, the first coating composition is applied to one surface of the support substrate and photocured to form a first coating layer to which the low-reflection coating composition is then applied, followed by curing to form a low-reflection coating layer. Afterwards, the second hard coating composition is applied to the other surface of the substrate and photocured to form a second coating layer. Then, the first coating layer is coated with a low-reflection coating composition, followed by curing to form a low-reflection coating layer.

When the plastic film is prepared in this manner, the UV light for photocuring the second coating composition is irradiated to a surface opposite to that coated with the first coating composition. Thus, the curl which may be generated by setting shrinkage in the photocuring step of the first coating composition is counterbalanced to afford a flat plastic film. No additional flattening processes are thus needed.

According to one embodiment of the present invention, the first photocuring step after application of the first coating composition to one side of the support substrate may be performed until the binder contained in the first coating composition is partially crosslinked. The term "partially crosslinked," as used herein, may be expressed as a crosslink degree over 0% and less than 100%, as compared to the degree of complete crosslink set as 100%. For example, the first photocuring step may be carried out to the degree that the photocurable functional group of the binder contained in the first coating composition may be crosslinked by approximately 30 to approximately 60 mol %, or by approximately 40 to approximately 50 mol %.

Partial crosslinking, instead of complete crosslinking, of the binder may bring about an improvement in the setting shrinkage of the first coating composition, conferring excellent physical and optical properties as well as a high level of hardness on the plastic film without generating curls or cracks. The binder which remains uncured in the first coating composition may be crosslinked in the subsequent photocuring step for the second coating composition.

Being superior in hardness, low reflectance, scratch resistance, transparency, durability, light resistance, and light transmittance, the plastic film according to the present invention can find useful applications in various fields.

In one embodiment of the present invention, when the plastic film of the present invention is disposed on a plane after exposure to a temperature of 50° C. or higher at a humidity of 80% or higher for 70 hrs or longer, the maximum distance at which each edge or side of the hard coating film is spaced apart from the plane may be about 1.0 mm or less, about 0.6 mm or less, or about 0.3 mm or less. More particularly, when the plastic film of the present invention is disposed on a plane after exposure to a temperature of 50° C. to 90° C. at a humidity of 80% to 90% for 70 to 100 hrs, each edge or side of the plastic film is spaced apart from the plane by about 1.0 mm or less, about 0.6 mm or less, or about 0.3 mm or less, maximally.

In addition, the plastic film of the present invention may have a pencil hardness of 6H or more, 7H or more, or 8H or more at a load of 1 kg.

Further, after the plastic film of the present invention is tested by double rubbing 10 times with a steel wool #0000 under a load of 500 g on a friction tester, only two or less scratches may appear.

The plastic film of the present invention may have a light transmittance of 94% or more, and a haze of 1.0% or less, 0.5% or less, or 0.4% or less. Further, the plastic film of the present invention may have a reflectance of 2.5% or less, or 2.0% or less.

Furthermore, the plastic film of the present invention may have an initial color b* (b* defined by the CIE 1976 L*a*b* color space) of 1.0 or less. After the coating film is exposed to UV-B under an ultraviolet lamp for 72 hrs or more, it may have a color b* value which differs from the pre-exposed color b* value by 0.5 or less, or by 0.4 or less.

As described above, the plastic film of the present invention can be applied to various fields. For example, the plastic film of the present invention can be used in touch panels of mobile terminals, smart phones or tablet PCs, and cover or device panels of various displays.

A better understanding of the present invention may be obtained through the following examples which are set forth to illustrate, but are not to be construed as limiting the present invention.

A better understanding of the present invention may be obtained through the following examples which are set forth to illustrate, but are not to be construed as limiting the present invention.

EXAMPLES

Preparation of Low-Reflection Coating Composition

Preparation Example 1

A mixture of 18 g of pentaerythritol triacrylate, 18 g of dipentaerythritol pentaacrylate, 250 g of a hollow silica particle dispersion (manufacturer: Catalysts and Chemicals Ltd., a dispersion of hollow silica particles having a number average diameter of 50~60 nm in methylisobutyl ketone (MIBK) with a solid content of 20 wt %), 10 g of polyethersiloxane polymer (manufacturer: EVONIK, brand name: TEGO Glide 450), and 4 g of a photoinitiator (manufacturer: CIBA, brand name: Irgacure 184) was stirred for 30 min. The mixture was diluted with methylisobutyl ketone (MIBK) until its solid content decreased to 3 wt %. The resulting dilution was used as a low-reflection coating composition.

Comparative Preparation Example 1

A mixture of 18 g of pentaerythritol triacrylate, 18 g of dipentaerythritol pentaacrylate, 250 g of a silica fine particle dispersion (manufacturer: NISSAN CHEMICAL, brand name: MIBK-ST, a dispersion of silica pine particles having a number average diameter of 10~15 nm in methylisobutyl ketone (MIBK), with a solid content of 20 wt %), 10 g of a polyethersiloxane polymer (manufacturer: EVONIK, brand name: TEGO Glide 450), and 4 g of a photoinitiator (manufacturer: CIBA, brand name: Irgacure 184) was stirred for 30 min. The mixture was diluted with methylisobutyl ketone (MIBK) until its solid content decreased to 3 wt %. The resulting dilution was used as a low-reflection coating composition.

Comparison Preparation Example 2

A mixture of 18 g of pentaerythritol triacrylate, 18 g of dipentaerythritol pentaacrylate, 200 g of methylisobutyl ketone (MIBK), 10 g of a polyethersiloxane polymer (manufacturer: EVONIK, brand name: TEGO Glide 450), and 4 g of a photoinitiator (manufacturer: CIBA, brand name: Irgacure 184) was stirred for 30 min. The mixture was diluted with methylisobutyl ketone (MIBK) until its solid content decreased to 3 wt %. The resulting dilution was used as a low-reflection coating composition.

Preparation of Photocurable Elastomer

Preparation Example 2

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain polyrotaxane in which polylactone with an acrylate moiety conjugated to the end thereof acted as the macrocycle while cyclodextrin was positioned as the stopper.

The polyrotaxane had a weight average molecular weight of 600,000 g/mol, and was found to have an elongation of 20%, as measured according to ASTM D638.

Preparation of Plastic Film

Example 1

A first coating composition was prepared by mixing 2 g of hydroxyethylacrylate (HEA), 11.2 g of a silica-dipentaerythritolhexaacrylate (DPHA) composite in which nanosilica with a size of 20~30 nm was dispersed (silica 3.2 g, DPHA 8.0 g), 0.2 g of a photoinitiator (brand name: Darocur TPO), 0.1 g of a benzotriazole-based yellowing inhibitor (brand name: Tinuvin 400), and 0.05 g of a fluorine-based surfactant (brand name: FC4430). A second coating composition was also prepared in the same manner.

The first coating composition was applied to a PET substrate 188 μm thick with a size of 15 cm×20 cm, and then subjected to photocuring by exposure to 280~350 nm UV light from a black light fluorescence lamp to form a first coating layer.

Subsequently, the second coating composition was applied to the back side of the substrate, and then exposed to 280~350 nm UV light from a black light fluorescence lamp to give a second coating layer.

Then, the first coating layer was coated with a low-reflection coating composition of Preparation Example 1, followed by photocuring by exposure to 200~320 nm UV light from a halogen UV lamp to form a low-reflection coating layer.

After completion of the photocuring, each of the first and the second coating layers formed on both sides of the substrate was 100 μm thick while the low-reflection coating layer laminated on the first coating was 100 nm thick.

Example 2

A plastic film was prepared in the same manner as in Example 1, with the exception that 2 g of trimethylolpropane triacrylate (TMPTA), instead of 2 g of hydroxyethyl acrylate (HEA), was employed in each of the first and the second coating layers of Example 1.

Example 3

A plastic film was prepared in the same manner as in Example 1, with the exception that 1 g of hydroxyethyl acrylate (HEA) and 13.5 g of silica-trimethylolpropane triacrylate (TMPTA) composite (silica 4.5 g, TMPTA 9.0 g) in which nanosilica with a size of 20~30 nm is dispersed were used, respectively instead of 2 g of hydroxyethyl acrylate (HEA) and 11.2 g of silica-DPHA composite, in each of the first and the second coating layers of Example 1.

Example 4

A first coating composition was prepared by mixing 9 g of a silica-dipentaerythritolhexaacrylate (DPHA) composite in which nanosilica with a particle size of 20~30 nm was dispersed by 40 wt % (silica 3.6 g, DPHA 5.4 g), 1 g of the polyrotaxane of Preparation Example 2, 0.2 g of a photoinitiator (brand name: Darocur TPO), 0.1 g of a benzotriazole-based yellowing inhibitor (brand name: Tinuvin 400), and 0.05 g of a fluorine-based surfactant (brand name: FC4430). A second coating composition was also prepared in the same manner.

The first coating composition was applied to a PET substrate 188 μm thick with a size of 15 cm×20 cm, and then subjected to photocuring by exposure to 280~350 nm UV light from a black light fluorescence lamp to form a first coating layer.

Subsequently, the second coating composition was applied to the back side of the substrate, and then exposed to 280~350 nm UV light from a black light fluorescence lamp to give a second coating layer.

Then, the first coating layer was coated with a low-reflection coating composition of Preparation Example 1, followed by photocuring by exposure to 200~320 nm UV light from a halogen UV lamp to form a low-reflection coating layer.

After completion of the photocuring, each of the first and the second coating layers formed on both sides of the substrate was 100 μm thick while the low-reflection coating layer laminated on the first coating was 100 nm thick.

Example 5

A plastic film was prepared in the same manner as in Example 4, with the exception that 1 g of a urethane acrylate polymer (brand name: UA200PA, Shinnakamura Chemicals Corp., weight average molecular weight: 2,600 g/mol, elongation measured according to ASTM D638: 170%), instead of 1 g of the polyrotaxane of Preparation Example 2, was used in each of the first and the second coating compositions.

Example 6

A plastic film was prepared in the same manner as in Example 4, with the exception that 1 g of a urethane acrylate polymer (brand name: UA340P, Shinnakamura Chemicals Corp., weight average molecular weight: 13,000 g/mol, elongation measured according to ASTM D638: 150%), instead of 1 g of the polyrotaxane of Preparation Example 2, was used in each of the first and the second coating compositions.

Comparative Example 1

A plastic film was prepared in the same manner as in Example 1, with the exception that only 10 g of dipentaerythritolhexaacrylate (DPHA), instead of 2 g of hydroxyethylacrylate (HEA) and 11.2 g of the silica-DPHA composite, was employed in each of the first and the second coating compositions.

Comparative Example 2

A plastic film was prepared in the same manner as in Example 1, with the exception that the coating compositions of Comparative Preparation Example 1, instead of the coating compositions of Preparation Example 1, were employed.

Comparative Example 3

A plastic film was prepared in the same manner as in Example 1, with the exception that the coating compositions of Comparative Preparation Example 2, instead of the low-reflection coating composition of Preparation Example 1, were employed.

Comparative Example 4

A first and a second coating composition each were prepared by mixing 10 g of a silica-dipentaerythritol-hexacrylate (DPHA) composite in which nanosilica with a particle size of 20~30 nm was dispersed by 40 wt % (silica 4 g, DPHA 6 g), 0.1 g of a benzotriazole-based yellowing inhibitor (brand name: Tinuvin 400), and 0.05 g of a fluorine-based surfactant (brand name: FC4430).

The remaining procedure was conducted with these coating compositions, as described in Example 4, to afford a plastic film.

Comparative Example 5

A plastic film was prepared in the same manner as in Example 4, with the exception that the coating composition of Comparative Preparation Example 1, instead of the low-reflection coating composition of Preparation Example 1, was employed.

Comparative Example 6

A plastic film was prepared in the same manner as in Example 4, with the exception that the coating composition of Comparative Preparation Example 2, instead of the coating composition of Preparation Example 1, was employed.

Contents of major components in each of the compositions of Examples 1 to 6 and Comparative Examples 1 to 6 are summarized in Table 1, below.

TABLE 1

| | 1st and 2nd Coating Composition | | |
|---|---|---|---|
| Ex. # | Binder | Silica (unit: g) | Low-reflection Composition |
| Example 1 | DPHA (8 g), HEA (2 g) | 3.2 g | Preparation Ex. 1 |
| Example 2 | DPHA (8 g), TMPTA (2 g) | 3.2 g | Preparation Ex. 1 |
| Example 3 | TMPTA (9 g), HEA (1 g) | 4.5 g | Preparation Ex. 1 |
| Example 4 | DPHA (5.4 g), Preparation Ex. 2 (1 g) | 3.6 g | Preparation Ex. 1 |
| Example 5 | DPHA (5.4 g), UA200PA (1 g) | 3.6 g | Preparation Ex. 1 |
| Example 6 | DPHA (5.4 g), UA340P (1 g) | 3.6 g | Preparation Ex. 1 |
| Comparative Example 1 | DPHA (10 g) | 0 | Preparation Ex. 1 |
| Comparative Example 2 | DPHA (8 g), HEA (2 g) | 3.2 g | C. Preparation Ex. 1 |
| Comparative Example 3 | DPHA (8 g), HEA (2 g) | 3.2 g | C. Preparation Ex. 2 |
| Comparative Example 4 | DPHA (6 g) | 4 g | Preparation Ex. 1 |
| Comparative Example 5 | DPHA (5.4 g), Preparation Ex. 2 (1 g) | 3.6 g | C. Preparation Ex. 1 |
| Comparative Example 6 | DPHA (5.4 g), Preparation Ex. 2 (1 g) | 3.6 g | C. Preparation Ex. 2 |

TEST EXAMPLES

<Measurement Methods>
1) Pencil Hardness

Pencil hardness was evaluated according to the Japanese Standard JIS K5400. In this regard, the plastic film was doubly rubbed three times with a pencil hardness meter under a load of 1.0 kg to determine the hardness at which no scratches appeared.

2) Scratch Resistance

The plastic film was doubly rubbed 10 times with a steel wool (#0000) under a load of 0.5 kg in a friction tester, and scratches thus formed were counted. Evaluation was made of the scratch resistance of the films by marking ○ for two or less scratches, Δ for two to less than five scratches, and × for five or more scratches.

3) Light Resistance

Differences in color b* value of the plastic films were measured before and after exposure to UVB from UV lamp for 72 hrs or longer.

4) Transmittance and Haze

The plastic film was measured for transmittance and haze using a spectrophotometer (brand name: COH-400).

5) Reflectance

After back sides of plastic films were made blackish, their reflectance was measured using the Solid Spec. 3700 spectrometer of Shimadzu Co as mean reflectance.

6) Curl Property at High Humidity and Temperature

After each plastic film was cut into a piece with dimensions of 10 cm×10 cm and stored for 72 hrs in a chamber maintained at a temperature of 85° C. and a humidity of 85%, the pieces were placed on a flat plane. A maximal distance at which each edge of the pieces was apart from the plane was measured.

7) Cylindrical Bending Test

Each of the plastic films was wound on a cylindrical mandrel having a diameter of 3 cm. When the plastic film was not cracked, it was evaluated as OK. If the plastic film was cracked, it was evaluated as X.

8) Impact Resistance

The impact resistance of each of the plastic films was evaluated by determining whether or not each of the plastic films was cracked when a 22 g steel ball was freely dropped thereon from a height of 40 cm. Each of the plastic films was evaluated as OK when it was not cracked, and as X when cracked.

The results of the physical properties measured in the plastic films of the Examples and the Comparative Examples are summarized in Tables 2 and 3, below.

TABLE 2

|  | Ex. 1 | Ex. 2 | Ex. 3 | Ex. 4 | Ex. 5 | Ex. 6 |
|---|---|---|---|---|---|---|
| Pencil hardness | 7H | 7H | 8H | 8H | 8H | 7H |
| Scratch resistance | ○ | ○ | ○ | ○ | ○ | ○ |
| Light resistance | 0.22 | 0.23 | 0.19 | 0.20 | 0.25 | 0.21 |
| Transmittance | 95.3 | 95.5 | 95.2 | 95.0 | 95.3 | 94.8 |
| Haze | 0.2 | 0.2 | 0.3 | 0.3 | 0.2 | 0.3 |
| Reflectance | 1.30% | 1.40% | 1.40% | 1.30% | 1.40% | 1.40% |
| Bending test | OK | OK | OK | OK | OK | OK |
| Curl property at high humidity & temperature | 0.3 mm | 0.2 mm | 0.2 mm | 0.3 mm | 0.2 mm | 0.2 mm |
| Impact resistance | OK | OK | OK | OK | OK | OK |

TABLE 3

|  | C. Ex. 1 | C. Ex. 2 | C. Ex. 3 | C. Ex. 4 | C. Ex. 5 | C. Ex. 6 |
|---|---|---|---|---|---|---|
| Pencil hardness | 4H | 8H | 8H | 8H | 8H | 8H |
| Scratch resistance | ○ | ○ | ○ | ○ | ○ | ○ |
| Light resistance | 0.25 | 0.21 | 0.23 | 0.35 | 0.38 | 0.32 |
| Transmittance | 95.1 | 92.8 | 92.1 | 95.0 | 92.1 | 91.8 |
| Haze | 0.2 | 0.3 | 0.3 | 0.4 | 0.2 | 0.3 |
| Reflectance | 1.30% | 4.10% | 4.40% | 1.30% | 4.10% | 4.40% |
| Bending test | X | OK | OK | X | OK | OK |
| Curl property at high humidity & temperature | 0.3 mm | 0.2 mm | 0.2 mm | 0.3 mm | 0.2 mm | 0.3 mm |
| Impact resistance | X | OK | OK | X | OK | OK |

As is understood from data of Tables 2 and 3, the plastic films of the present invention exhibited excellence in the physical properties including pencil hardness, impact resistance, reflectance, etc.

What is claimed is:

1. A plastic film, comprising:
   a support substrate;
   a first coating layer, formed on one side of the support substrate;
   a low-reflection coating layer, formed on the first coating layer; and
   a second coating layer, formed on another side of the support substrate,
   wherein, the first and second coating layers have a thickness of 70 to 300 μm,
   wherein, each of the first and the second coating layers comprise a first photocrosslinked copolymer and first inorganic fine particles dispersed in the first photocrosslinked copolymer,
   wherein, the first photocrosslinked copolymer comprises a photocurable elastomer comprising a polyrotaxane,
   wherein, the low-reflection coating layer comprises a second photocrosslinked copolymer, and hollow silica particles dispersed in the second photocrosslinked copolymer, and
   wherein the plastic film has a pencil hardness of 6H or more at a load of 1 kg.

2. The plastic film of claim 1, wherein the first photocrosslinked copolymer further comprises a crosslinked copolymer of a tri- to hexafunctional acrylate-based monomer.

3. The plastic film of claim 2, wherein the tri- to hexafunctional acrylate-based monomer comprises at least one selected from the group consisting of trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

4. The plastic film of claim 1, wherein the first photocrosslinked copolymer is a crosslinked copolymer of a tri- to hexafunctional acrylate monomer and the photocurable elastomer.

5. The plastic film of claim 4, wherein the tri- to hexafunctional acrylate-based monomer comprises at least one selected from the group consisting of trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

6. The plastic film of claim 1, wherein the photocurable elastomer has an elongation of 15 to 200% as measured according to ASTM D638.

7. The plastic film of claim 1, wherein the polyrotaxane comprises a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

8. The plastic film of claim 1, wherein the second photocrosslinked copolymer is a copolymer in which monomers or oligomers containing a (meth)acrylate functional group, an aryloyl functional group, or a vinyl functional group is polymerized.

9. The plastic film of claim 1, wherein the low-reflection coating layer further comprise a polyethersiloxane-based polymer represented by the following Chemical Formula 1:

[Chemical Formula 1]

wherein, $R^1$ and $R^2$ each are independently an alkyl group of 1 to 10 carbon atoms, an aryl group of 6 to 10 carbon atoms, an aralkyl group of 6 to 15 carbon atoms, a fluorinated aryl group of 6 to 10 carbon atoms, or a fluorinated aralkyl group of 6 to 15 carbon atoms; and n is an integer of 100 to 600.

10. The plastic film of claim 1, wherein the hollow silica particles have a number average diameter of 20 to 80 nm.

11. The plastic film of claim 1, wherein the support substrate is made of at least one selected from polyethyleneterephtalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), and a fluorine-based resin.

12. The plastic film of claim 1, wherein the first inorganic fine particles comprise at least one selected from the group consisting of silica nanoparticles, aluminum oxide fine particles, titanium oxide fine particles, and zinc oxide fine particles.

13. The plastic film of claim 1, wherein the first and the second coating layers each contain the first photocrosslinked copolymer in an amount of 50 to 90 weight parts and the first inorganic fine particles in an amount of 10 to 50 weight parts, based on 100 weight parts of each of the first and the second coating layers.

14. The plastic film of claim 1, wherein the low-reflection coating layer contains the hollow silica particles in an amount of 50 to 250 weight parts based on 100 weight parts of the second photocrosslinked copolymer.

15. The plastic film of claim 1, wherein the low-reflection coating layer ranges in thickness from 50 to 200 nm.

16. The plastic film of claim 1, having a reflectance of 2.5% or less.

* * * * *